Patented Nov. 23, 1948

2,454,486

UNITED STATES PATENT OFFICE 2,454,486

VULCANIZABLE MIXTURE OF THERMOPLASTIC INTERPOLYMERS

George William Stanton and Charles Everett Lowry, Midland, Mich., assignors to The Dow Chemical Company, Midland, Mich., a corporation of Delaware No Drawing. Application July 28, 1947, Serial No. 764,242

4 Claims. (Cl. 260—45.5)

This invention relates to a composition of matter comprising particular proportions of each of two types of thermosplastic polymeric materials, which composition is vulcanizable to produce a rubber-like product having the properties desired in shoe soles.

A synthetic, rubber-like vulcanized composition, to be satisfactory for use in shoe soles, should be able to meet each of several physical standards. Thus, when subjected to a standard abrasion test, it should be reduced in thickness less than 0.0025 inch (2.5 mils) and should lose less than 10 milligrams weight per square inch of abrased surface for each 1,000 revolutions of a standard abrasive wheel applied thereto. It should have a tensile strength of at least 550 pounds per square inch and should not be capable of much more than 400 percent elongation. It should withstand at least 5,000 bends about 1 inch mandrel at room temperature and should not break when bent 180° over such a mandrel after having been held at 0° F. for 12 hours. In thicknesses of $\frac{1}{16}$ inch, a pull of at least 30 pounds should be required to cause a stitch to tear through the sole when dry, and a pull of at least 25 pounds should be required when wet. Most of the usual synthetic rubber-like materials either fail to meet the foregoing minimum specifications, or exceed them by very small margins, and very few compositions have been found which are deemed satisfactory for the purpose.

It is among the objects of the present invention to provide a new and useful vulcanizable composition which, when vulcanized, has the properties desired in synthetic shoe soles. A related object is the provision of a satisfactory vulcanized synthetic shoe sole.

The invention, whereby the foregoing objects are realized, resides in the discovery of a composition of matter containing (A) from 10 to 67 per cent by weight of the thermoplastic interpolymer produced by polymerizing styrene while in aqueous emulsion at a temperature above 50° C. and then adding monomeric butadiene to the emulsion of substantially fully polymerized styrene and polymerizing the butadiene while dispersed in the emulsion at a temperature above 50° C., in proportions such that the final interpolymer contains from 20 to 80, and preferably from 35 to 45 per cent of styrene interpolymerized with from 80 to 20, and preferably from 65 to 55 per cent of butadiene, and (B) correspondingly from 90 to 33 per cent by weight of the interpolymer of (1) from 25 to 85 per cent by weight of vinylidene chloride, (2) from 15 to 50 per cent of butadiene, and (3) from 0 to 60 per cent of a compound copolymerizable with the vinylidene chloride and butadiene, containing a single ethylenic double bond in its monomeric molecule and capable of forming by itself a thermoplastic polymer. The preferred (B) constituent is the binary interpolymer of from 50 to 85 per cent of vinylidene chloride and from 50 to 15 per cent of butadiene. The preferred mixture contains at least as much of the (B) as of the (A) constituent. All of the above-defined compositions are vulcanizable and in the vulcanized condition, in sheet form, have the properties desired for shoe soles.

The (A) and (B) constituents are compatible with one another in all proportions, but mixtures containing less than about 10 per cent of the (A) constituent and those containing less than about 33 per cent of the (B) constituent do not yield vulcanizates which are satisfactory for the present purpose. Those with too little (A) are too hard and too brittle at low temperatures, when vulcanized, and those with too little (B) do not vulcanize readily, if at all, and are too soft. The two interpolymers are mixed, before vulcanization, by any of the usual mixing procedures. They may be mixed together on a multiple roll mill, either cold or hot, or they may be mixed in a ball mill or similar tumbler. The vulcanizable mixture may also be produced by mixing the required proportions of the synthetic latices resulting from the emulsion polymerization of the two constituents, and precipitating together the mixed dispersed solids.

Any of the usual vulcanizing agents and mixtures may be used. One typical and satisfactory formulation comprises, for each 100 parts by weight of the (B) constituent, about 1 part of stearic acid, about 10 parts of dibutyl phthalate, about 5 parts of litharge, about 1 part of benzothiazyl disulfide, and about 2 parts of sulfur. There may be used, as well, with this or other typical formulations, minor amounts of waxes, reinforcing pigments and fillers, as will be illustrated in the examples. The mixture of agents used will include, in each case, sulfur, an accelerator, and an activator, and will usually include a plasticizer.

Satisfactory vulcanization and cure is obtained in from 20 to 90 minutes at a temperature in the range from 135° to 160° C. Vulcanization is preferably effected while the compounded slabs are confined under a pressure of from 400 to 1,000 pounds per square inch.

The following examples illustrate the practice of the invention:

EXAMPLE 1

A series of compositions was prepared containing:

(A) Constituent—35 per cent styrene, 65 per cent butadiene—variable amounts as shown in Table I.
(B) Constituent—70 per cent vinylidene chloride, 30 per cent butadiene—100 parts.

|  | Parts |
|---|---|
| Stearic acid—lubricant | 1 |
| Dibutyl phthalate—plasticizer or softener | 10 |
| Magnesium oxide—activator | 5 |
| Sulfur—vulcanizer | 2 |
| Benzothiazyl disulfide—accelerator | 1 |
| Finely divided hydrated calcium silicate—filler—variable amounts as shown in Table I. | |

The (B) constituent was broken down on a cold mill, and the softener and lubricant, (A) constituent, activator, vulcanizer, accelerator and reinforcing filler were added in the order given. Sometimes the (A) constituent was divided in two parts, and one of these was added and worked in on a hot mill after all other agents had been added. The mix was sheeted from the mill and cut into pieces of appropriate size which were then cured at 138° C. for the indicated time, in minutes, and under a pressure of 750 pounds per square inch. The cured vulcanized slabs were subjected to a number of tests, with results as shown in the table. The low temperature brittle point of each composition was below −60° C.

Abrasion index, mils reduction in thickness per 1,000 revolutions of a standard abrasive disc under standard load _____ 0.8
Stitch tear strength (⅛ inch basis), dry _____pounds__ 45.7
Same, wet _____do____ 43.5

Flexing—appearance after 5,000 flexes at room temperature—no cracks.
Cold flex—bent over 1 inch mandrel after conditioning overnight at 0° F.—no cracks.

Similar tests run on all of the cured compositions show that each of them meets or exceeds the established requirements for shoe soles.

EXAMPLE 2

In a manner similar to that reported in Example 1, a series of compositions was prepared containing:

|  | Parts |
|---|---|
| (A) Constituent—30 per cent styrene, 70 per cent butadiene | 33 |
| (B) Constituent—55 per cent vinylidene chloride, 30 per cent butadiene, 15 per cent other polymerizable compound listed | 67 |
| Stearic acid | 1 |
| Dibutyl phthalate | 10 |
| Litharge | 5 |
| Benzothiazyl disulfide | 1 |
| Sulfur | 2 |

The mixing and vulcanizing procedure was that reported in the prior example. Results of physical tests on the vulcanized sheets are given in Table II.

*Table II*

| Constituent (B) (3) | Cure Time, Minutes | Tensile Strength, lbs./sq. in. | Elongation to Break, Per Cent | Permanent Set at Break, Per Cent | Durometer "A" Hardness | Tensile Stress in Pounds Per Square Inch at— | |
|---|---|---|---|---|---|---|---|
| | | | | | | 100% Elong. | 300% Elong. |
| Vinyl chloride | 60 | 910 | 370 | 20 | 66 | 420 | 720 |
| Ethyl acrylate | 40 | 1,015 | 410 | 16 | 62 | 255 | 655 |
| Alpha-methyl styrene | 40 | 1,260 | 430 | 14 | 62 | 300 | 875 |
| Iso-butylene | 20 | 730 | 370 | 8 | 64 | 250 | 590 |
| Iso-butylene | 40 | 770 | 380 | 10 | 64 | 215 | 590 |
| Acrylonitrile | 40 | 1,480 | 440 | 32 | 74 | 350 | 825 |
| p-chlorostyrene | 60 | 1,175 | 370 | 16 | 68 | 325 | 885 |
| Methyl methacrylate | 60 | 1,050 | 420 | 18 | 64 | 230 | 680 |

The vulcanized sheets were also tested for abrasion resistance, and found to compare favorably

*Table I*

| Batch No. | (A) Constituent, Parts | Calcium Silicate, Parts | Cure Time, Min. | Tensile Strength, lbs./sq. in. | Elongation to Break, percent | Permanent Set at Break, percent | Durometer "A" Hardness | Pounds Per Square Inch Tensile Stress at— | |
|---|---|---|---|---|---|---|---|---|---|
| | | | | | | | | 100% Elong. | 300% Elong. |
| 1 | 50 | 75 | 20 | 990 | 330 | 24 | 90 | 650 | 970 |
| 2 | 50 | 75 | 60 | 1,140 | 330 | 26 | 90 | 680 | 1,100 |
| 3 | 50 | 75 | 80 | 1,220 | 300 | 24 | 90 | 715 | 1,220 |
| 4 | 100 | 50 | 20 | 690 | 350 | 28 | 82 | 460 | 670 |
| 5 | 100 | 50 | 80 | 850 | 380 | 34 | 86 | 490 | 770 |
| 6 | 200 | | 20 | 600 | 220 | 20 | 83 | 460 | |
| 7 | 200 | | 80 | 840 | 350 | 40 | 84 | 465 | 780 |
| 8 | 200 | 50 | 20 | 810 | 300 | 40 | 88 | 600 | 810 |
| 9 | 200 | 50 | 80 | 930 | 270 | 30 | 92 | 650 | |

Several sole slabs from batch No. 2, reported in the table, were submitted to shoe manufacturers for further specific tests. The reports indicate a confirmation of the physical properties listed in the table and give the following additional data:

with the compositions of Table I, and to be generally superior in this regard to commercial shoe soles made of synthetic rubber-like interpolymers of styrene and butadiene, of the type known universally as GR-S rubber. These sheets also pass the previously described flexing tests, both at room temperature and after conditioning at sub-zero temperatures. The stitch tear strengths of the various sheets have diverse values, but all are above the recommended 30 pounds (dry) and 25 pounds (wet).

Example 3

A particularly desirable shoe sole composition has been developed comprising the following constituents:

| | Parts |
|---|---|
| (A) 35 per cent styrene, 65 per cent butadiene | 62.5 |
| (B) 70 per cent vinylidene chloride, 30 per cent butadiene | 100 |
| Stearic acid | 1 |
| Carnauba wax | 5 |
| Magnesium oxide | 5 |
| Mercaptobenzothiazole | 1 |
| Sulfur | 2 |
| Calcium silicate (soft, fine, hydrated) | 37.5 |
| Titanium dioxide (purified) | 2.5 |
| Red lead | 1.25 |

When vulcanized in sheet form, this composition was tested in comparison with two commercial synthetic rubber-like shoe soles. The results are given in Table III.

Table III

| | Composition of Example 3 | Commercial Sole "X" | Commercial Sole "Y" |
|---|---|---|---|
| Hardness (Durometer A): | | | |
| Top | 90 | 93 | 80 |
| Bottom | 90 | 82 | 80 |
| Tensile strength, pounds per square inch | 1,700 | 1,100 | 1,300 |
| Set, at break | 44 | (1) | 40 |
| Density | 1.25 | 1.21 | 1.19 |
| Abrasion index (see Note) | 5.7 | 8.3 | 9.0 |

NOTE.—Abrasion index is reported in this example as the number of milligrams lost per thousand revolutions of a standard abrasive wheel under a standard load on a Taber abraser, per square inch of abrased surface.
[1] Not determined.

In a manner similar to that reported in Example 2, compositions according to the present invention were prepared and vulcanized, in which the (A) constituent contained from 20 to 80 per cent of prepolymerized styrene and correspondingly from 80 to 20 per cent of after-polymerized butadiene and the (B) constituent contained, in addition to the previously defined proportions of (1) vinylidene chloride and (2) butadiene, varying amounts from nil up to 60 per cent of (3) a polymerizable compound, such as those listed in Example 2, containing a single ethylenic double bond in its monomeric molecule and capable of forming by itself a thermoplastic polymer. Each of these vulcanized compositions, when in sheet form, had the properties desired in synthetic shoe soles, and, while the compositions varied among themselves in particular properties, they were all superior to the individual interpolymers from which they were made and were at least comparable with the available commercial synthetic sole materials.

It is desired that a vulcanized shoe sole be relatively "dead" and inelastic so that, among other reasons, it will not tend to spring away from and be cut by the sole stitching. A laboratory test which gives an index of this property is the "Bashore Rebound" test. High values indicate elastic materials, and low values indicate inelastic ones. The Bashore rebound values of vulcanized shoe soles made from the common synthetic rubber known as GR-S are in the range from 50 to 80, while those of soles made in accordance with the present invention are in the range from 10 to 20.

Shoe soles made of the various compositions specifically described in the examples, as well as of other compositions falling within the present invention, have been subjected to use on cement floors and have shown negligible signs of wear in 3 months. Prolonged tests indicate an expected life of a year or more.

The compositions of the present invention are not limited to use as shoe soles, but their combination of properties makes them especially desirable for such use.

We claim:

1. A vulcanizate of a mixture of (A) from 10 to 67 per cent by weight of the thermoplastic interpolymer produced by polymerizing styrene while in aqueous emulsion, at a temperature above 50° C. and then adding monomeric butadiene to the emulsion of substantially fully polymerized styrene and polymerizing the butadiene while dispersed in the emulsion at a temperature above 50° C., in proportions such that the final interpolymer contains from 20 to 80 per cent of styrene interpolymerized with from 80 to 20 per cent of butadiene, and (B) correspondingly from 90 to 33 per cent by weight of the interpolymer of (1) from 25 to 85 per cent of vinylidene chloride, (2) from 15 to 50 per cent of butadiene, and (3) up to 60 per cent of a compound copolymerizable with the vinylidene chloride and butadiene, containing a single ethylenic double bond in its monomeric molecule and capable of forming by itself a thermoplastic polymer.

2. A shoe sole composed of the vulcanizate claimed in claim 1.

3. A vulcanizate of a mixture of (A) from 10 to 67 per cent by weight of the thermoplastic interpolymer produced by polymerizing styrene while in aqueous emulsion, at a temperature above 50° C. and then adding monomeric butadiene to the emulsion of substantially fully polymerized styrene and polymerizing the butadiene while dispersed in the emulsion at a temperature above 50° C. in proportions such that the final interpolymer contains from 35 to 45 per cent of styrene interpolymerized with from 65 to 55 per cent of butadiene, and (B) correspondingly from 90 to 33 per cent by weight of the interpolymer of from 50 to 85 per cent of vinylidene chloride and from 50 to 15 per cent of butadiene.

4. A shoe sole composed of the vulcanizate claimed in claim 3.

GEORGE WILLIAM STANTON.
CHARLES EVERETT LOWRY.

No references cited.